United States Patent
Karadi

(10) Patent No.: US 10,958,161 B2
(45) Date of Patent: Mar. 23, 2021

(54) MULTI-PHASE HIGH CONVERSION RATIO SWITCHED CAPACITOR POWER CONVERTER

(71) Applicant: NXP B.V., Eindhoven (NL)

(72) Inventor: Ravichandra Karadi, San Jose, CA (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/527,693

(22) Filed: Jul. 31, 2019

(65) Prior Publication Data

US 2021/0036603 A1 Feb. 4, 2021

(51) Int. Cl.
*H02M 3/07* (2006.01)
(52) U.S. Cl.
CPC .................................... *H02M 3/07* (2013.01)
(58) Field of Classification Search
None
See application file for complete search history.

(56) References Cited

U.S. PATENT DOCUMENTS

| | | | | |
|---|---|---|---|---|
| 8,159,091 B2 * | 4/2012 | Yeates | ...................... | H02M 3/07 307/110 |
| 9,570,976 B2 | 2/2017 | Karadi et al. | | |
| 2019/0393782 A1 * | 12/2019 | Teplechuk | .............. | H02M 3/06 |

FOREIGN PATENT DOCUMENTS

| | | |
|---|---|---|
| CN | 104410271 A | 3/2015 |
| WO | 2009136368 A1 | 11/2009 |
| WO | 2016138361 A1 | 9/2016 |

OTHER PUBLICATIONS

Karadi et al., "3-Phase 6/1 Switched-Capacitor DC-DC Boost Converter Providing 16V at 7mA and 70.3% Efficiency in 1.1mm^3," ISSCC, Feb. 2014; pp. 92-94; 3 pages.
Karadi et al., "Switched-Capacitor Power-Converter Topology Overview and Performance Comparison," Advances in Analog Circuit Design 2016, Aug. 2016; 23 pages.
Karadi, "Synthesis of Switched-Capacitor Power Converters: An Iterative Algorithm," IEEE Compel 2015; 4 pages.
Linear Technology, "LT3494/LT3494A Micropower Low Noise Boost Converters with Output Disconnect," Data Sheet, LT 0507, Rev. B; 12 pages.
Makowski et al., "Performance Limits of Switched-Capacitor DC-DC Converters," IEEE Power Electronics Specialists Conference, vol. 2, Jun. 1995, pp. 1215-1221; 7 pages.
Meyaert et al., "A Light-Load-Efficient 11/1 Switched-Capacitor DC-DC Converter with 94.7% Efficiency while Delivering 100mW at 3.3V," IEEE Journal of Solid-State Circuits, Mar. 2015; 4 pages.

(Continued)

*Primary Examiner* — Jeffery S Zweizig

(57) ABSTRACT

A method for multi-phase high conversion ratio Switched Capacitor Power Conversion includes sequentially forming one of four subcircuits during a respective timing phase, wherein each subcircuit comprises at most three capacitors. Conversion between an input voltage of an input and an output voltage of an output occurs by sequentially connecting for each respective timing phase, one of the input, the output, a ground, a top plate of a first one of the three capacitors and a bottom plate of the first one of the three capacitors to one of a top plate of a second one of the three capacitors and a bottom plate of the second one of the three capacitors.

10 Claims, 8 Drawing Sheets

(56) References Cited

OTHER PUBLICATIONS

Salem et al., "A Battery-Connected 24-Ratio Switched Capacitor PMIC Achieving 95.5%-Efficiency," VLSI 2015 Symposium on VLSI Circuits, IEEE, Jun. 2015, pp. C340-C341; 2 pages.

Seeman et al., "Analysis and Optimization of Switched-Capacitor DC-DC Converters," IEEE Trans. on Power Electronics, vol. 23, Mar. 2008, pp. 841-851; 11 pages.

Su et al., "Component-Efficient Multiphase Switched-Capacitor DC-DC Converter With Configurable Conversion Ratios for LCD Driver Applications," EEEE Transactions on Circuits and Systems-II: Express Briefs, vol. 55, No. 8, Aug. 2008, 5 pages.

Larsen et al., "Dynamically Reconfigurable Gearbox Switched-Capacitor DC-DC Converter", 2018 IEEE Nordic Circuits and Systems Conference (NORCAS): Norchip and International Symposium of System-On-Chip (SOC), Oct. 31, 2018, 5 pages.

\* cited by examiner

MULTI-PHASE HIGH CONVERSION RATIO SWITCHED CAPACITOR POWER CONVERTER

FIELD

This disclosure relates generally to power conversion, and more specifically to switched capacitor power conversion with a reduced number of floating capacitors.

BACKGROUND

A Switched Capacitor Power Converter (SCPC) is becoming a popular alternative to an inductive converter. The main advantage of the SCPC is that it uses only switches and capacitors in contrast to inductive converters, which require inductors. Inductors tend to be larger, more expensive and more difficult to integrate onto silicon, compared to converters based on capacitors. SCPC's are more attractive in a number of applications, especially those that require fully integrated or miniaturized solutions.

The main disadvantage of the SCPC stems from the fact that the possible voltage conversion ratios are discrete and limited by the number of capacitors, unlike inductive converters where the conversion ratio is a continuous function of the duty ratio of the switching signal. The efficiency of the SCPC can be raised by using the right voltage conversion ratio, hence a higher number of capacitors will eventually enable a higher power efficiency. The number of capacitors and switches is less of a concern if the SCPC is completely integrated (e.g., both the switches and the capacitors are on chip), because in an integrated implementation the number of components is less important than their size. However, the size of the required capacitor scales with the required output power precluding complete integration in higher power applications. With external floating capacitors, the package size as well as the number of external capacitors are limiting factors to integration density. The number of package pins also increases with the number of external floating capacitors, thus adding to the cost and area of the integrated solution.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments described herein provide for a novel SCPC topology with a wide conversion ratio using a four-phase conversion cycle with three floating capacitors. An SCPC requires several floating capacitors for a given conversion ratio (e.g., a ratio of an output voltage to the SCPC divided by an input voltage of the SCPC). The possible conversion ratios "M" of an SCPC, with "Nc" floating capacitors is given by the following equation (1), where "P" and "Q" are positive integers:

$$M=[1\leq P\leq 2^{NC}]/[1\leq Q\leq 2^{Nc}] \qquad \text{Equation (1)}$$

In the case of a two phase SCPC topology, the number of capacitors can be especially limiting if their respective capacitive values are relatively large (e.g., several tens of nF). Large capacitors are often required to be implemented as discrete components, external to a monolithic integrated circuit (IC), thus undesirably increasing a pin count of the IC. In one example embodiment, the requirement for large capacitors is determined by the power level required to be converted by the SCPC.

In one example of a two phase SCPC, with a conversion ratio of M=1/10 (e.g., the output voltage is 10 times lower than the input voltage), at least 5 floating capacitors are required, as determined by the Fibonacci limit. With more modern multi-phase SCPCs, this conversion ratio can be accomplished with 4 floating capacitors. With the novel 4-phase topology described herein, only 3 floating capacitors are required to provide comparable performance. In addition, the reduction of the number of floating capacitors to three also requires fewer component pins, thus resulting in a more compact solution in pin limited and/or component limited applications. The conversion ratio of M=1/10 is of particular utility as a secondary converter in a system operating from a 110V alternating mains, primarily stepped down to a 33V level, and then further converted to 3.3V with an SCPC for powering an IC. Furthermore, variants of the SCPC topology described herein, provide for increased granularity in multi-ratio SCPC based circuits.

Figure 1:
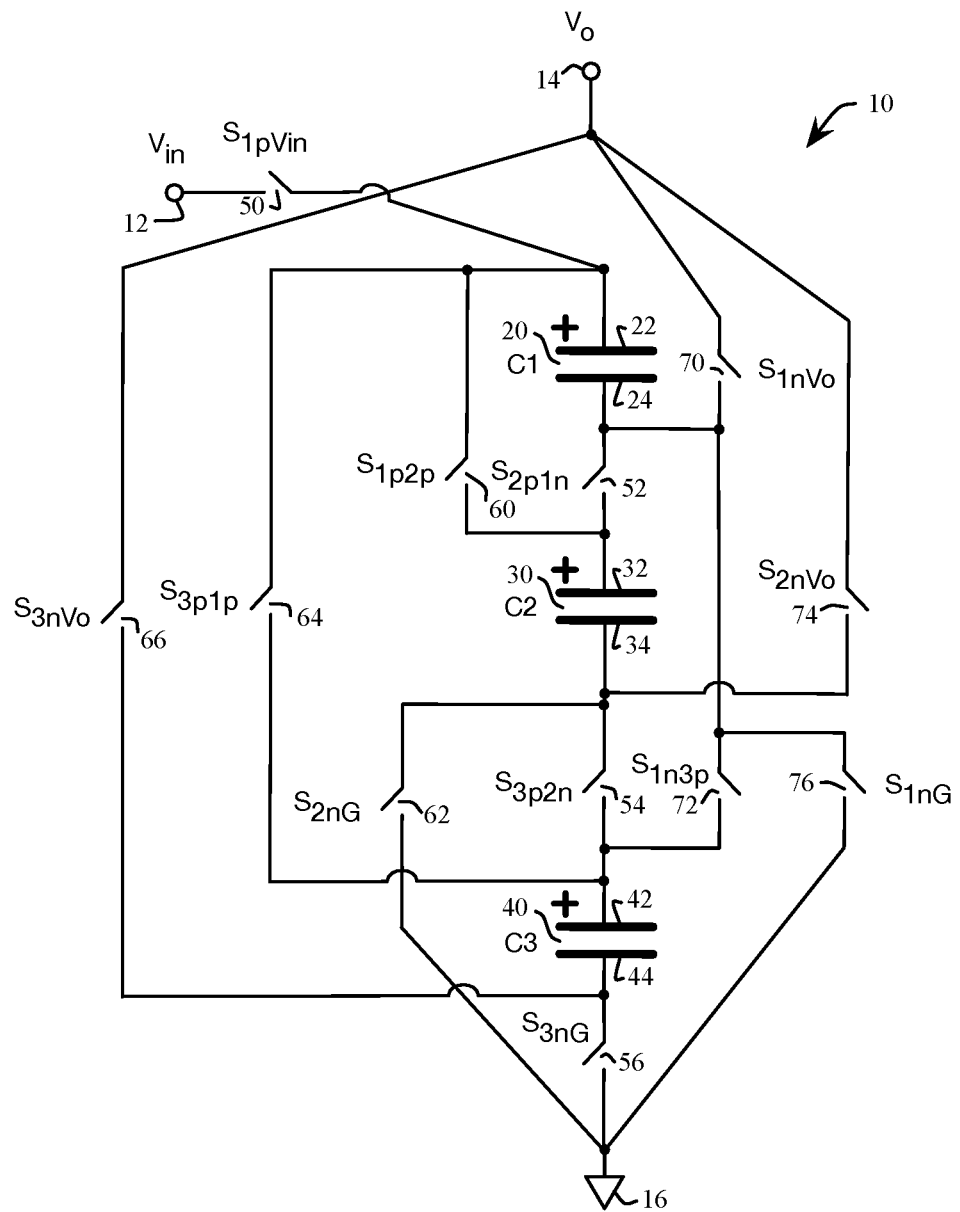
FIG. 1 is a schematic view of a Switched Capacitor Power Converter (SCPC), in accordance with an example embodiment of the present disclosure.

FIG. 1 shows an example embodiment 10 of an SCPC in accordance with the present disclosure. The embodiment 10 converts an input voltage on an input 12 to an output voltage on an output 14, wherein both the input voltage and the output voltage are referenced to a ground potential on a ground 16. In one embodiment, the ground potential is zero volts, however this disclosure is adaptable to other ground potential values. The embodiment 10 includes a first capacitor 20, having a first top plate 22 and a first bottom plate 24. The embodiment 10 includes a second capacitor 30, having a second top plate 32 and a second bottom plate 34. The embodiment 10 includes a third capacitor 40, having a third top plate 42 and a third bottom plate 44.

The embodiment 10 includes a plurality of switches to transfer charge, (and thus convert the input voltage to the output voltage), between the input 12 the output 14. This charge transfer occurs by sequentially configuring connections between two or more of the three capacitors 20, 30 and 40 the input, the output and the ground, using four sequential timing phases (e.g. "phases"). For convenience, the plurality of switches are named by the two nodes that the respective switch connects. For example, a switch S1pvin connects the input (Vin) to the first top plate 22 (or positive plate) of the first capacitor 20.

An S1pvin switch 50 is connected between the input 12 and the first top plate 22. An S2p1n switch 52 is connected between the first bottom plate 24 and a second top plate 32. An S3p2n switch 54 is connected between the second bottom plate 34 and the third top plate 42. An S3nG switch 56 is connected between the third bottom plate 44 and the ground 16. An S1p2p switch 60 is connected between the first top plate 22 and the second top plate 32. An S2nG switch 62 is connected between the second bottom plate 34 and the ground 16. An S3p1p switch 64 is connected between the first top plate 22 the third top plate 42. An S3nvo switch 66 is connected between the output 14 and the third bottom plate 44. An S1nvo switch 70 is connected between the output 14 and the first bottom plate 24. An S1n3p switch 72 is connected between the first bottom plate 24 and the third top plate 42. An S2nvo switch 74 is connected between the output 14 and the second bottom plate 34. An S1nG switch 76 is connected between the first bottom plate 24 and the ground 16.

Figure 2:
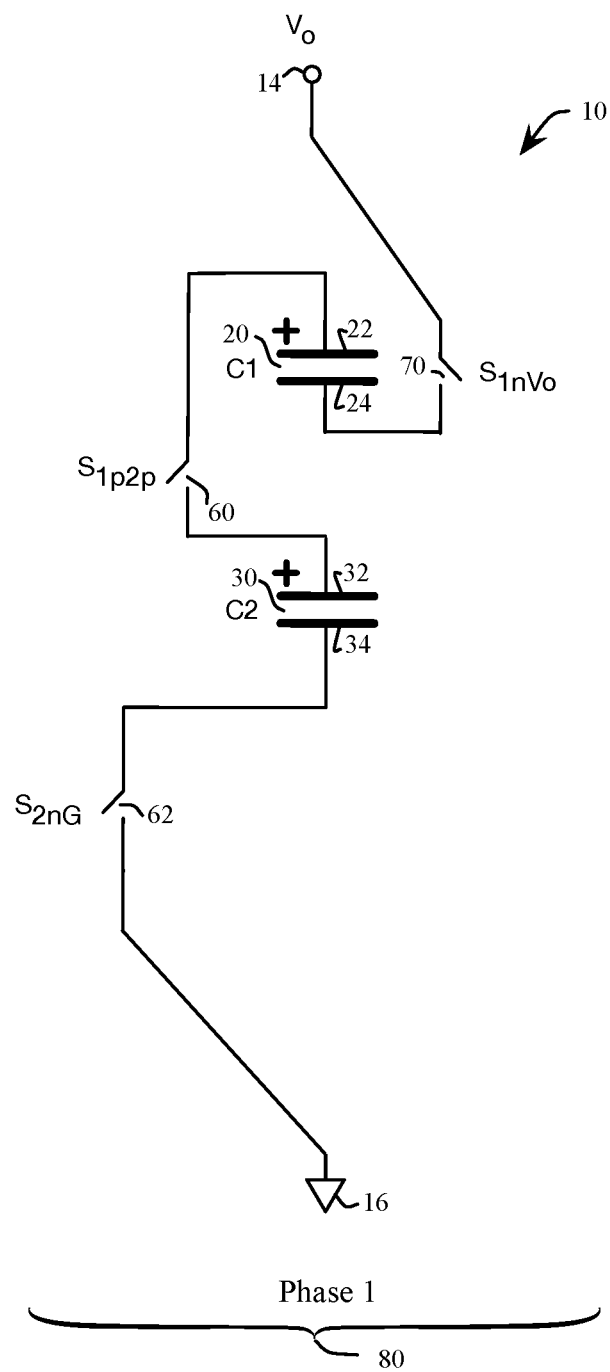
FIG. 2 is a schematic view of the SCPC of FIG. 1 during a first switching phase of a step-down conversion.
Figure 3:
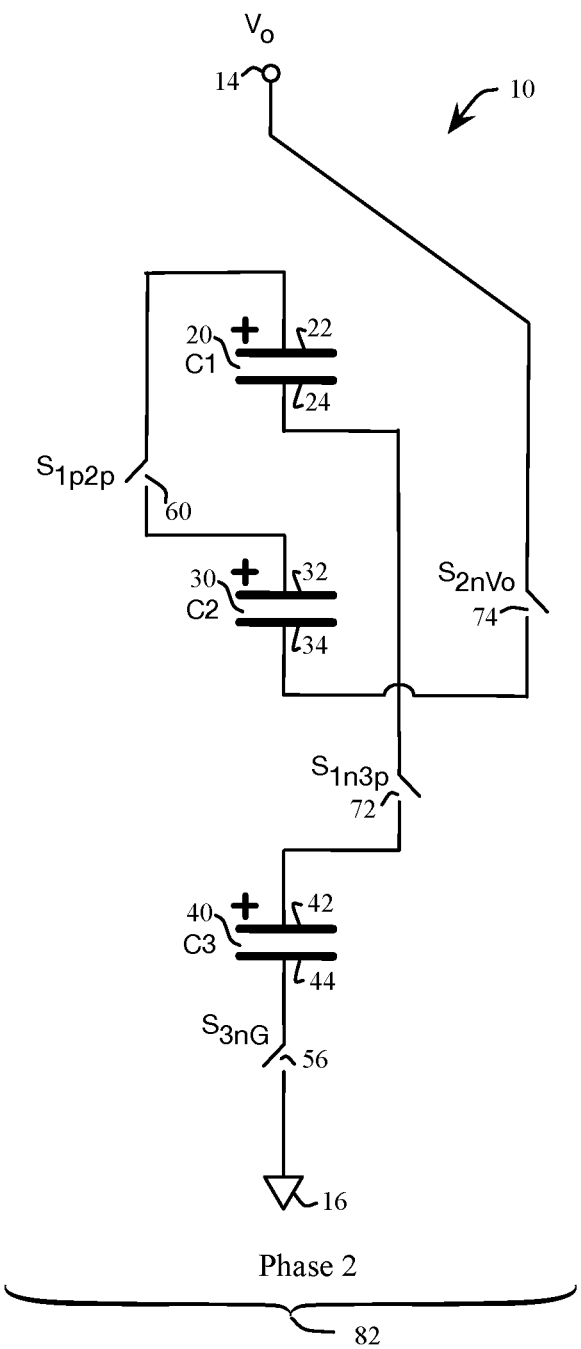
FIG. 3 is a schematic view of the SCPC of FIG. 1 during a second switching phase of a step-down conversion.
Figure 4:
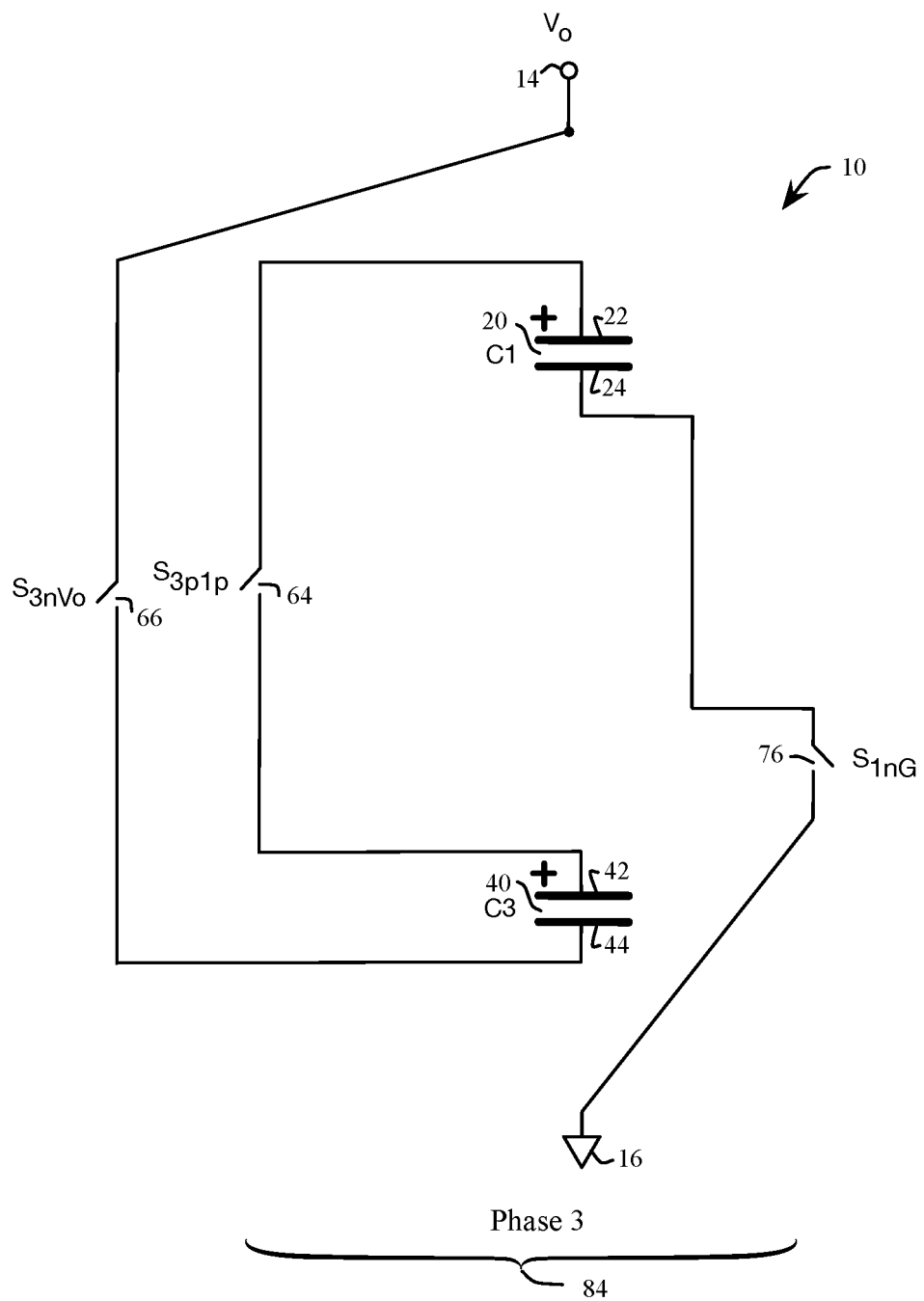
FIG. 4 is a schematic view of the SCPC of FIG. 1 during a third switching phase of a step-down conversion.

FIG. 2 to FIG. 4, with on-going reference to FIG. 1 show the switch connections for each of the four phases to implement an SCPC configured to down-convert an input voltage of (e.g. 10V) by a factor of one tenth to form an output voltage (e.g. 1V). FIG. 2 shows a connectivity of the embodiment 10 of FIG. 1 for the first phase 80 (e.g., phase 1). Specifically, the output 14 is connected with the S1nVo switch 70 to the first bottom plate 24. The first top plate 22 is connected with the switch S1p2p 60 to the second top plate 32. The second bottom plate 34 is connected with the S2nG switch 62 to the ground 16.

FIG. 3 shows the connectivity of the embodiment 10 of FIG. 1 for the second phase 82 (e.g., phase 2). Specifically, the output 14 is connected with the S2nVo switch 74 to the second bottom plate 34. The second top plate 32 is connected with the switch S1p2p 60 to the first top plate 22. The first bottom plate 24 is connected with the S1n3p switch 72 to the third top plate 42. The third bottom plate 44 is connected with the S3nG switch 56 to the ground 16.

FIG. 4 shows a connectivity of the embodiment 10 of FIG. 1 for the third phase 84 (e.g. phase 3). Specifically, the output 14 is connected with the S3nVo switch 66 to the third bottom plate 44. The third top plate 42 is connected with the S3p1p switch 64 to the first top plate 22. The first bottom plate 24 is connected with the S1nG switch 76 to the ground 16.

Figure 5:
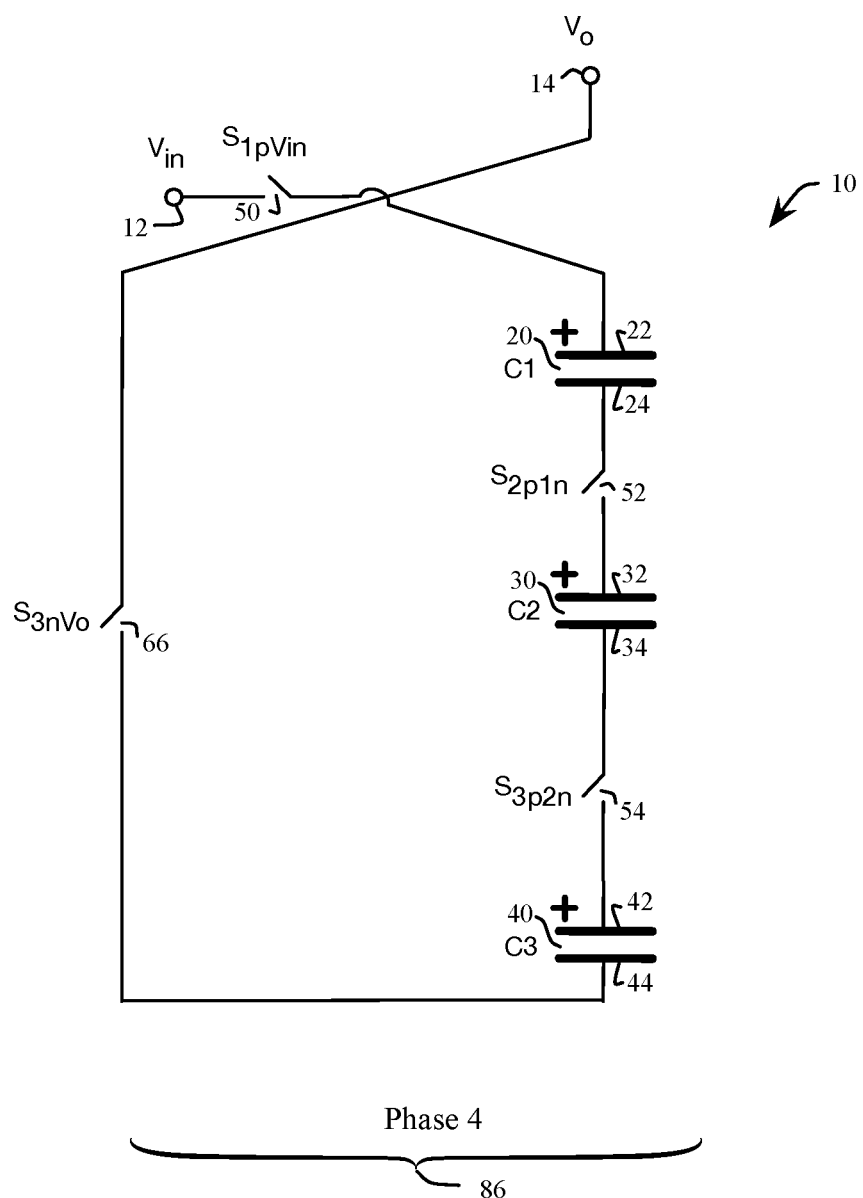
FIG. 5 is a schematic view of the SCPC of FIG. 1 during a fourth switching phase of a step-down conversion.

FIG. 5 shows the connectivity of the embodiment 10 of FIG. 1 for the fourth phase 86 (e.g., phase 4). Specifically, the output 14 is connected with the S3nVo switch 66 to the third bottom plate 44. The third top plate 42 is connected with the switch S3p2n 54 to the second bottom plate 34. The second top plate 32 is connected with the S2p1p switch 52 to the first bottom plate 24. The first top plate 22 is connected with the S1pVin switch 50 to the input 12.

It should be appreciated that the embodiment 10 of FIG. 1 is shown as a down-converter in FIG. 2 to FIG. 4. In one embodiment, with reference to equation (1) above, the conversion ratio is 1/10 to covert the input of 10V to an output of 1V. By changing the order of the timing phases (e.g. phase 1, phase 2, phase 3 and phase 4 are replaced with phase 4, phase 3, phase 2 and phase 1), the embodiment 10 becomes an up-converter configured to convert the output voltage on the output 14 to an input voltage on the input 12. In an example embodiment, each of the four phases 80, 82, 84 and 86 are non-overlapping phases with a switching frequency of 1 MHz and having a phase duration less than 250 ns. In an example embodiment, each of the capacitors 20, 30 and 40 have a nominal capacitance of one microfarad, and each switch has an "on" resistance of 10 hm. In another example embodiment, the SCPC shown in FIG. 1 is a secondary power converter preceded by a primary power converter, wherein the primary power converter is configured to convert a mains voltage (e.g. 110 Vac) to an intermediate voltage (e.g. 33 Vdc). The SCPC converts the intermediate voltage of 33 Vdc to 3.3 Vdc, suitable for powering an IC.

Figures 6, 7:
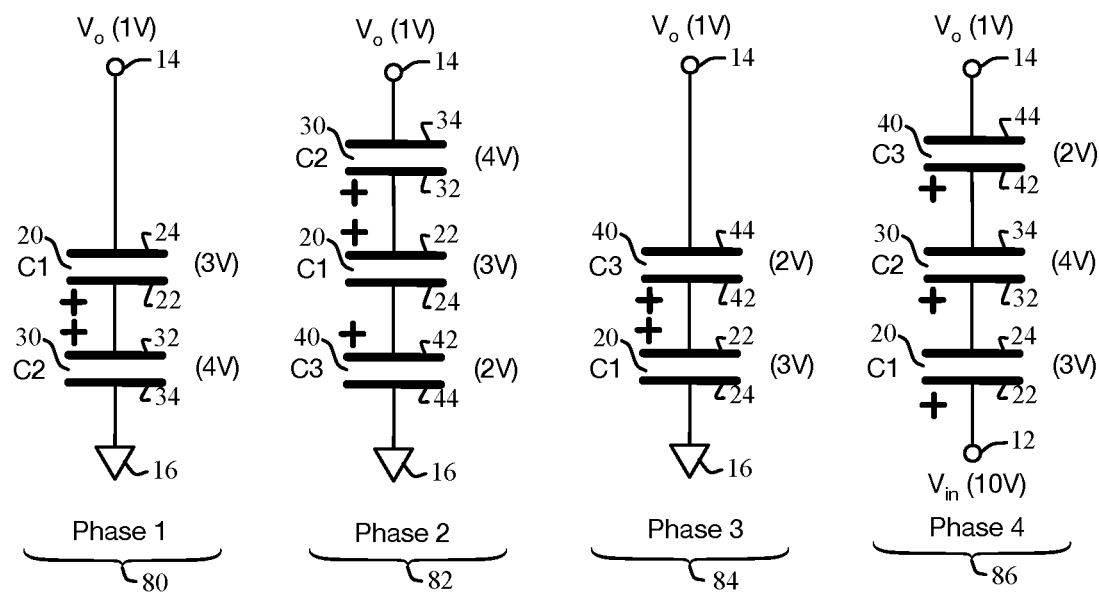
FIG. 6 is a schematic view of a state of the capacitors of the SCPC of FIG. 1 during the four switching phases shown in FIG. 2 to FIG. 5.
FIG. 7 is a tabular view of the cumulative charging of the capacitors, input and output of the SCPC of FIG. 1 during each of the four switching phases.

FIG. 6, with continued reference to FIG. 1 to FIG. 5, further describes the example embodiment 10 of a SCPC configured as a down-converter with a conversion ration of 1/10. During the first phase 80, the output 14 is connected to the first bottom plate 24. The first top plate 22 is connected to the second top plate 32. The second bottom plate 34 is connected to the ground 16. During the first phase 80, a charge "q1" (not shown) is transferred from the ground 16 to the output 14.

During the second phase 82, the output 14 is connected to the second bottom plate 34. The second top plate 32 is connected to the first top plate 22. The first bottom plate 24 is connected to the third top plate 42. The third bottom plate 44 is connected to the ground 16. During the second phase 82, a charge "q2" (not shown) is transferred from the ground 16 to the output 14.

During the third phase 84, the output 14 is connected to the third bottom plate 44. The third top plate 42 is connected to the first top plate 22. The first bottom plate 24 is connected to the ground 16. During the third phase 84, a charge "q3" (not shown) is transferred from the ground 16 to the output 14.

During the fourth phase 86, the output 14 is connected to the third bottom plate 44. The third top plate 42 is connected to the second bottom plate 34. The second top plate 32 is connected to the first bottom plate 24. The first top plate 22 is connected to the input 12. During the fourth phase 86, a charge "q4" (not shown) is transferred from the input 12 to the output 14.

For each of the four phases 80, 82, 84 and 86, the voltages across each capacitor 20, 30 and 40 remains stable presuming the SCPC is light loaded or suitably buffered from it's load. In steady state, the voltages across each capacitor remains stable for each phase of the four phase cycle. In the example embodiment of FIG. 6, the first capacitor 20 maintains 3V across the first top plate 22 and the first bottom plate 24. The second capacitor 30 maintains 4V across the second top plate 32 and the second bottom plate 34. The third capacitor 40 maintains 2V across the third top plate 42 and the third bottom plate 44. As shown by FIG. 6, Kirchoff's Voltage Law is satisfied for each of the four phases 80, 82, 84 and 86. For example, with respect to the first phase 80, the voltage between the ground 16 and the second top plate 32, (or the first top plate 22), is minus 4V. The voltage between the first top plate 22 and the first bottom plate is plus 3V. The voltage of the output 14 is plus 1V, hence −4V+3V+1V=0V.

With reference to FIG. 7, and continued reference to FIG. 6, the charge balance is also shown to be satisfied. More specifically, charge balance means that there is no net charge pumping or degradation of any of the three capacitors 20, 30 and 40 between the four phase cycles. By summating the charges q1, q2, q3 and q4 (corresponding to the four phases 80, 82, 84 and 86) described in FIG. 6, for each capacitor and taking into account the polarity of each of the capacitor connections, one determines four equations with three unknowns. For a normalized analysis, we set q4 to 1 unit. For the first capacitor 20, the charge balance over the four respective phases is q1−q2−q3+q4=0. For example, during the first phase 80, q1 is positive because q1 flows from the first top plate 22 towards the first bottom plate 24. Conversely, during the second phase 82, q2 is negative because q2 flows from the first bottom plate 24 to the first top plate 22. Similar to the derivation for the first capacitor 20, the charge balance of the second capacitor 30 is given by −q1+q2+0+q4=0, and the charge balance of the third capacitor 40 is given by 0−q2+q3+q4=0. Solving these four equations yields q4=1, q3=2, q2=3 and q1=4, as shown by the respective columns of FIG. 7 defined by the four phases 80, 82, 84 and 86. By summating the charge units for each of the rows defined by capacitors 20, 30 and 40 yields 0 net charge difference between conversion cycles. Similarly, FIG. 7 shows a cumulated charge of 1 unit at the input 12 and 10 units at the output 14.

Figure 8:
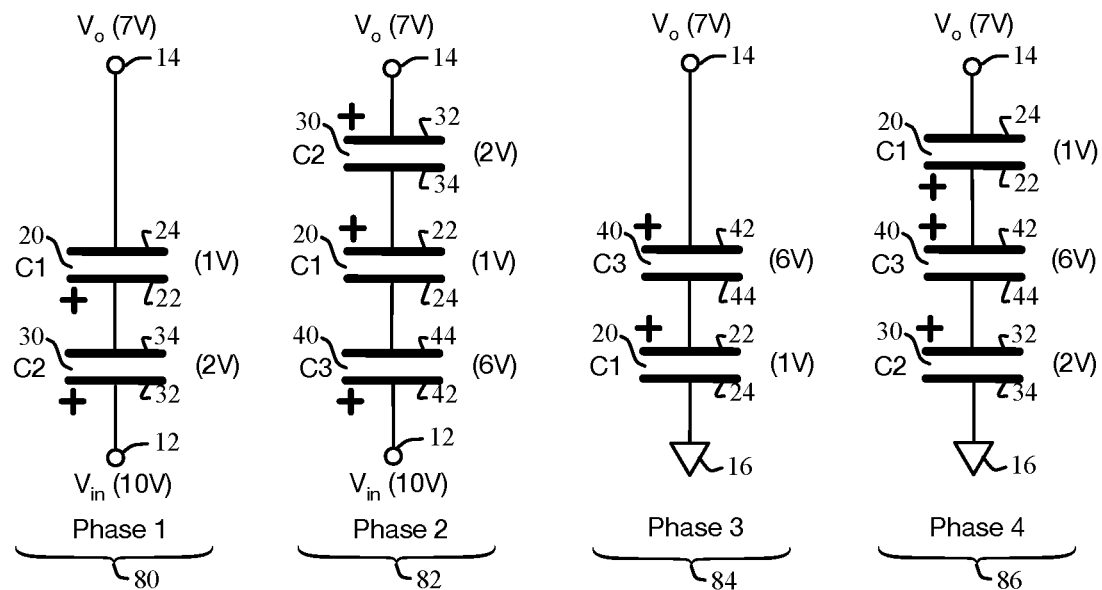
FIG. 8 is a schematic view of a state of the capacitors of the SCPC of FIG. 1 during the four switching phases of a step-down conversion, in accordance with another example embodiment of the present disclosure.
Figure 9:
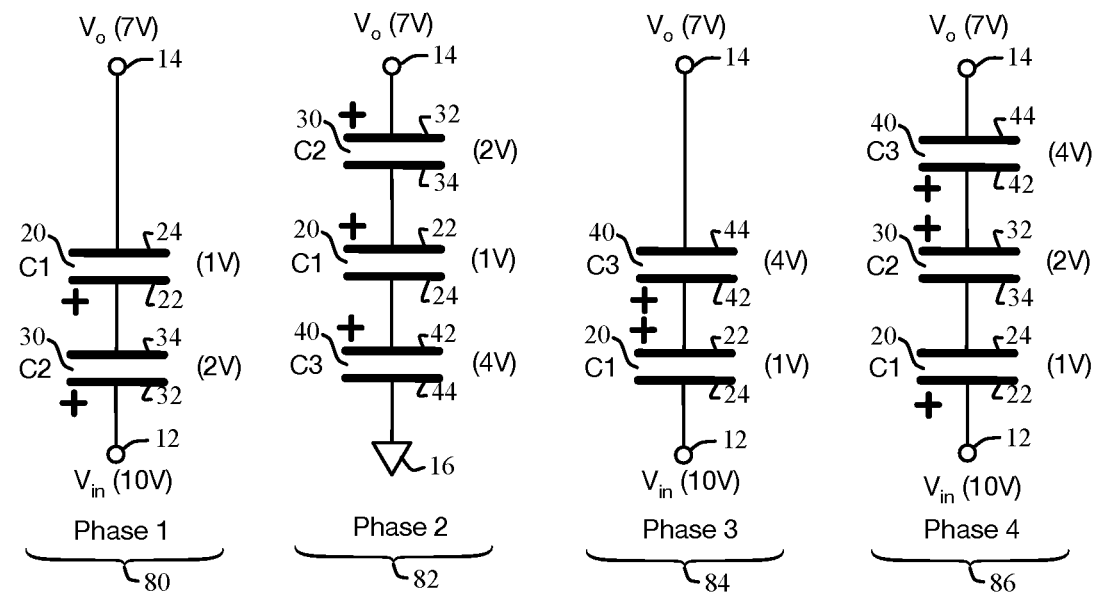
FIG. 9 is a schematic view of a state of the capacitors of the SCPC of FIG. 1 during the four switching phases of a step-down conversion, in accordance with another example embodiment of the present disclosure.

Additional topologies are realizable compared to the step-down converter shown in FIG. 1 to FIG. 6. In one example, each topology is inverted from being a step-down converter to being a step-up converter. In other embodiments, for a conversion ratio of M=k/10, k is one of 3, 7 or 9. In other embodiments, for a conversion ratio of M=k/9, k is one of 1, 2, 4, 5, 7 or 8. Two variants of a step-down converter are shown in FIG. 8 and FIG. 9, each having a conversion ratio (M) of 7/10, an input voltage of 10V and an output voltage of 7V. In one embodiment, a controller (not shown) controls the embodiment 10 of FIG. 1 to generate the four timing phases and switching to dynamically adjust the conversion ratio.

FIG. 8, with continued reference to FIG. 1, further describes the example embodiment 10 of a SCPC configured as a down-converter with a conversion ration of 7/10. During the first phase 80, the output 14 is connected to the first bottom plate 24. The first top plate 22 is connected to the second bottom plate 34. The second top plate 32 is connected to the input 12.

During the second phase 82, the output 14 is connected to the second top plate 32. The second bottom plate 34 is connected to the first top plate 22. The first bottom plate 24 is connected to the third bottom plate 44. The third top plate 42 is connected to the input 12.

During the third phase 84, the output 14 is connected to the third top plate 42. The third bottom plate 44 is connected to the first top plate 22. The first bottom plate 24 is connected to the ground 16.

During the fourth phase 86, the output 14 is connected to the first bottom plate 24. The first top plate 22 is connected to the third top plate 42. The third bottom plate 44 is connected to the second top plate 32. The second bottom plate 34 is connected to the ground 16.

FIG. 9, with continued reference to FIG. 1, further describes the example embodiment 10 of a SCPC configured as a down-converter with a conversion ration of 7/10. During the first phase 80, the output 14 is connected to the first bottom plate 24. The first top plate 22 is connected to the second bottom plate 34. The second top plate 32 is connected to the input 12.

During the second phase 82, the output 14 is connected to the second top plate 32. The second bottom plate 34 is connected to the first top plate 22. The first bottom plate 24 is connected to the third top plate 42. The third bottom plate 44 is connected to the ground 16.

During the third phase 84, the output 14 is connected to the third bottom plate 44. The third top plate 42 is connected to the first top plate 22. The first bottom plate 24 is connected to the input 12.

During the fourth phase 86, the output 14 is connected to the third bottom plate 44. The third top plate 42 is connected to the second top plate 32. The second bottom plate 34 is connected to the first bottom plate 24. The first top plate 22 is connected to the input 12.

Figure 10:
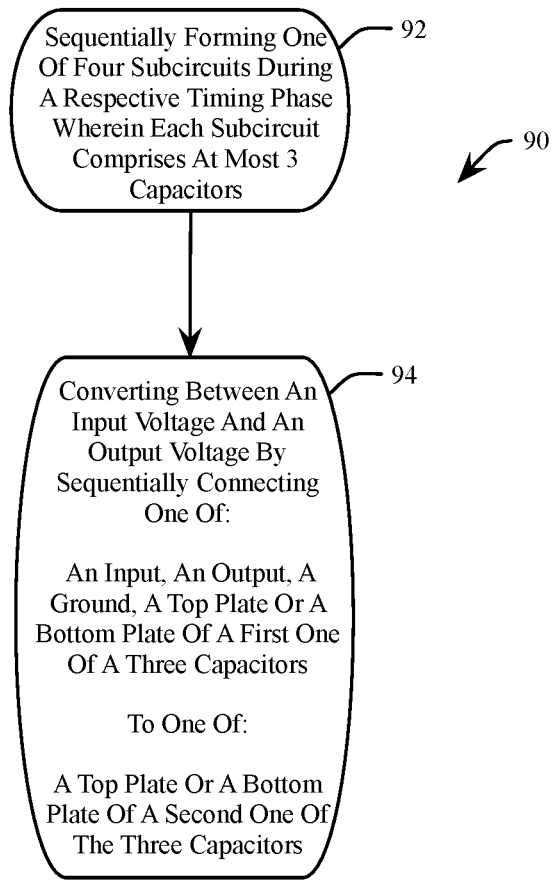
FIG. 10 is a flowchart representation of a method for multi-phase high conversion ratio switched capacitor power conversion in accordance with an example embodiment of the present disclosure.

FIG. 10 shows a method 90 for multi-phase power conversion with an SCPC having a high conversion ratio. At 92, four subcircuits (e.g., see FIG. 2 to FIG. 5) are formed during a respective timing phase 80, 82, 84 and 86. Each subcircuit comprises at most three capacitors (e.g., capacitors 20, 30 and 40). At 94, the input voltage is converted to the output voltage by sequentially connecting during each of the respective timing phases 80, 82, 84 and 86, one of the input 12, the output 14, a ground 16, the bottom plate 24, 34 or 44, or the top plate 22, 32 or 42 of a first one of the three capacitors, to one of a top plate 22, 32 or 42 or a bottom plate 24, 34 or 44 second one of the capacitors.

As will be appreciated, embodiments as disclosed include at least the following. In one embodiment, an apparatus comprises a first capacitor comprising a first top plate and a first bottom plate. A second capacitor comprises a second top plate and a second bottom plate. A third capacitor comprises a third top plate and a third bottom plate. An input comprises an input voltage. An output comprises an output voltage. A plurality of switches comprises an S1$p$Vin switch connected between the input and the first top plate. An S2$p$in switch is connected between the first bottom plate and the second top plate. An S3$p$2$n$ switch is connected between the second bottom plate and the third top plate. An S3$n$G switch is connected between the third bottom plate and a ground. An S1$p$2$p$ switch is connected between the first top plate and the second top plate. An S2$n$G switch is connected between the second bottom plate and the ground. An S3$p$1$p$ switch is connected between the first top plate the third top plate. An S3$n$Vo switch is connected between the output and the third bottom plate. An S1$n$Vo switch is connected between the output and the first bottom plate. An S1$n$3$p$ switch is connected between the first bottom plate and the third top plate. An S2$n$Vo switch is connected between the output and the second bottom plate. An S1$n$G switch is connected between the first bottom plate and the ground.

Alternative embodiments of the apparatus include one of the following features, or any combination thereof. During a first phase, the output is connected to the first bottom plate, the first top plate is connected to the second top plate and the second bottom plate is connected to the ground, during a second phase, the output is connected to the second bottom plate, the second top plate is connected to the first top plate, the first bottom plate is connected to the third top plate, and the third bottom plate is connected to the ground, during a third phase, the output is connected to the third bottom plate, the third top plate is connected to the first top plate and the first bottom plate is connected to the ground, and during a fourth phase, the output is connected to the third bottom plate, the third top plate is connected to the second bottom plate, the second top plate is connected to the first bottom plate, and the first top plate is connected to the input, wherein the output voltage is converted from the input voltage and the output voltage is one tenth of the input voltage. The third phase follows the fourth phase, the second phase follows the third phase, the first phase follows the second phase, wherein the input voltage is converted from the output voltage and the input voltage is ten times greater than the output voltage. During a first phase, the output is connected to the first bottom plate, the first top plate is connected to the second bottom plate and the second top plate is connected to the input, during a second phase, the output is connected to the second top plate, the second bottom plate is connected to the first top plate, the first bottom plate is connected to the third bottom plate, and the third top plate is connected to the input, during a third phase, the output is connected to the third top plate, the third bottom plate is connected to the first top plate and the first bottom plate is connected to the ground, and during a fourth phase, the output is connected to the first bottom plate, the first top plate is connected to the third top plate, the third bottom plate is connected to the second top plate, and the second bottom plate is connected to the ground, wherein the output voltage is converted from the input voltage and output voltage is seven tenths of the input voltage. During a first phase, the output is connected to the first bottom plate, the first top plate is connected to the second bottom plate and the second top plate is connected to the input, during a second phase, the output is connected to the second top plate, the second bottom plate is connected to the first top plate, the first bottom plate is connected to the third top plate, and the third bottom plate is connected to the ground, during a third phase, the output is connected to the third bottom plate, the third top plate is connected to the first top plate and the first bottom plate is connected to the input, and during a fourth phase, the output is connected to the third bottom plate, the third top plate is connected to the second top plate, the second bottom plate is connected to the first bottom plate, and the first top plate is connected to the input, wherein the output voltage is converted from the input voltage and the output voltage is seven tenths of the input voltage. The output voltage is converted from the input voltage with a conversion ratio defined by a numerator representing the output voltage and equal to one of 1, 3, 7 and 9, and a denominator representing the input voltage and equal to 10. The output voltage is converted from the input voltage with a conversion ratio defined by a numerator representing the output voltage and equal to one of 1, 2, 4, 5, 7 and 8, and a denominator representing the input voltage and equal to 9. A controller is configured to control a respective subset of the plurality of switches for each of four non-overlapping phases. Each of the plurality of switches is a field effect transistor. A gate of at least one of the plurality of switches is connected to a multiplexer configured to multiplex more than one timing phase signal from a controller.

In another embodiment, a method for multi-phase high conversion ratio switched capacitor power conversion comprises sequentially forming one of four subcircuits during a respective timing phase, wherein each subcircuit comprises at most three capacitors. Conversions occurs between an input voltage of an input and an output voltage of an output, by sequentially connecting for each respective timing phase, one of the input, the output, a ground, a top plate of a first one of the three capacitors and a bottom plate of the first one of the three capacitors to one of a top plate of a second one of the three capacitors and a bottom plate of the second one of the three capacitors.

Alternative embodiments of the method for multi-phase high conversion ratio switched capacitor power conversion include one of the following features, or any combination thereof. The input voltage is converted to the output voltage, wherein the first subcircuit is formed with a first timing phase, the second subcircuit is formed with a second timing phase, the third subcircuit is formed with a third timing phase and the fourth subcircuit is formed with a fourth timing phase. The output voltage is converted to the input voltage, wherein the first subcircuit is formed with a fourth timing phase, the second subcircuit is formed with a third timing phase, the third subcircuit is formed with a second timing phase and the fourth subcircuit is formed with a first timing phase. The input voltage is converted to the output voltage with a conversion ratio defined by a numerator representing the output voltage and equal to one of 1, 3, 7 and 9, and a denominator representing the input voltage and equal to 10. The input voltage is converted to the output voltage with a conversion ratio defined by a numerator representing the output voltage and equal to one of 1, 2, 4, 5, 7 and 8, and a denominator representing the input voltage and equal to 9. Each of the respective timing phases is generated with a controller.

In another embodiment, a system comprises three capacitors. An input comprises an input voltage. An output comprises an output voltage converted from the input voltage. A controller is configured to sequentially form each of four subcircuits during a respective nonoverlapping timing phase, wherein each of the four subcircuits comprises one of a top plate of a first one of the three capacitors and a bottom plate of the first one of the three capacitors switchably connected to one of the input, the output, a ground, a top plate of a second one of the three capacitors and a bottom plate of the second one of the three capacitors.

Alternative embodiments of the system include one of the following features, or any combination thereof. The system is a secondary switched capacitor power converter connected between a primary power converter configured to convert a mains voltage to the input voltage. The controller is configured to switchably connect two of the three capacitors together during a first timing phase and a third timing phase, and to switchably connect three of the three capacitors together during a second timing phase and a fourth timing phase. The controller is programmable and configured to switchably connect at least two of the three capacitors in each of four nonoverlapping timing phases to achieve one of a plurality of conversion ratios defined by the output voltage divided by the input voltage.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. An apparatus comprising:
   a first capacitor comprising a first top plate and a first bottom plate;
   a second capacitor comprising a second top plate and a second bottom plate;
   a third capacitor comprising a third top plate and a third bottom plate;
   an input comprising an input voltage;
   an output comprising an output voltage; and
   a plurality of switches comprising an S1pVin switch connected between the input and the first top plate, an S2p1n switch connected between the first bottom plate and the second top plate, an S3p2n switch connected between the second bottom plate and the third top plate, an S3nG switch connected between the third bottom plate and a ground, an S1p2p switch connected between the first top plate and the second top plate, an S2nG switch connected between the second bottom plate and the ground, an S3p1p switch connected between the first top plate the third top plate, an S3nVo switch connected between the output and the third bottom plate, an S1nVo switch connected between the output and the first bottom plate, an S1n3p switch connected between the first bottom plate and the third top plate, an S2nVo switch connected between the output and the second bottom plate, and an S1nG switch connected between the first bottom plate and the ground.

2. The apparatus of claim 1 wherein:
   during a first phase, the output is connected to the first bottom plate, the first top plate is connected to the second top plate and the second bottom plate is connected to the ground,
   during a second phase, the output is connected to the second bottom plate, the second top plate is connected to the first top plate, the first bottom plate is connected to the third top plate, and the third bottom plate is connected to the ground,
   during a third phase, the output is connected to the third bottom plate, the third top plate is connected to the first top plate and the first bottom plate is connected to the ground, and
   during a fourth phase, the output is connected to the third bottom plate, the third top plate is connected to the second bottom plate, the second top plate is connected to the first bottom plate, and the first top plate is connected to the input, wherein the output voltage is converted from the input voltage and the output voltage is one tenth of the input voltage.

3. The apparatus of claim 2 wherein the third phase follows the fourth phase, the second phase follows the third phase, the first phase follows the second phase, wherein the input voltage is converted from the output voltage and the input voltage is ten times greater than the output voltage.

4. The apparatus of claim 1 wherein:
   during a first phase, the output is connected to the first bottom plate, the first top plate is connected to the second bottom plate and the second top plate is connected to the input,
   during a second phase, the output is connected to the second top plate, the second bottom plate is connected to the first top plate, the first bottom plate is connected to the third bottom plate, and the third top plate is connected to the input,
   during a third phase, the output is connected to the third top plate, the third bottom plate is connected to the first top plate and the first bottom plate is connected to the ground, and
   during a fourth phase, the output is connected to the first bottom plate, the first top plate is connected to the third top plate, the third bottom plate is connected to the second top plate, and the second bottom plate is connected to the ground, wherein the output voltage is converted from the input voltage and output voltage is seven tenths of the input voltage.

5. The apparatus of claim 1 wherein:
   during a first phase, the output is connected to the first bottom plate, the first top plate is connected to the second bottom plate and the second top plate is connected to the input,
   during a second phase, the output is connected to the second top plate, the second bottom plate is connected to the first top plate, the first bottom plate is connected to the third top plate, and the third bottom plate is connected to the ground,
   during a third phase, the output is connected to the third bottom plate, the third top plate is connected to the first top plate and the first bottom plate is connected to the input, and
   during a fourth phase, the output is connected to the third bottom plate, the third top plate is connected to the second top plate, the second bottom plate is connected to the first bottom plate, and the first top plate is connected to the input, wherein the output voltage is converted from the input voltage and the output voltage is seven tenths of the input voltage.

6. The apparatus of claim 1 wherein the output voltage is converted from the input voltage with a conversion ratio defined by a numerator representing the output voltage and equal to one of 1, 3, 7 and 9, and a denominator representing the input voltage and equal to 10.

7. The apparatus of claim 1 wherein the output voltage is converted from the input voltage with a conversion ratio defined by a numerator representing the output voltage and equal to one of 1, 2, 4, 5, 7 and 8, and a denominator representing the input voltage and equal to 9.

8. The apparatus of claim 1 further comprising a controller configured to control a respective subset of the plurality of switches for each of four non-overlapping phases.

9. The apparatus of claim 1 wherein each of the plurality of switches is a field effect transistor.

10. The apparatus of claim 1 wherein a gate of at least one of the plurality of switches is connected to a multiplexer configured to multiplex more than one timing phase signal from a controller.

* * * * *